COLOR TELEVISION IMAGE REPRODUCING SYSTEM

Filed Sept. 29, 1948

Inventor
George C. Sziklai
By [signature]
Attorney

UNITED STATES PATENT OFFICE 2,587,074

COLOR TELEVISION IMAGE REPRODUCING SYSTEM

George C. Sziklai, Princeton, N. J., assignor to Radio Corporation of America, a corporation of Delaware Application September 29, 1948, Serial No. 51,766

11 Claims. (Cl. 178—5.4)

Figure 1:
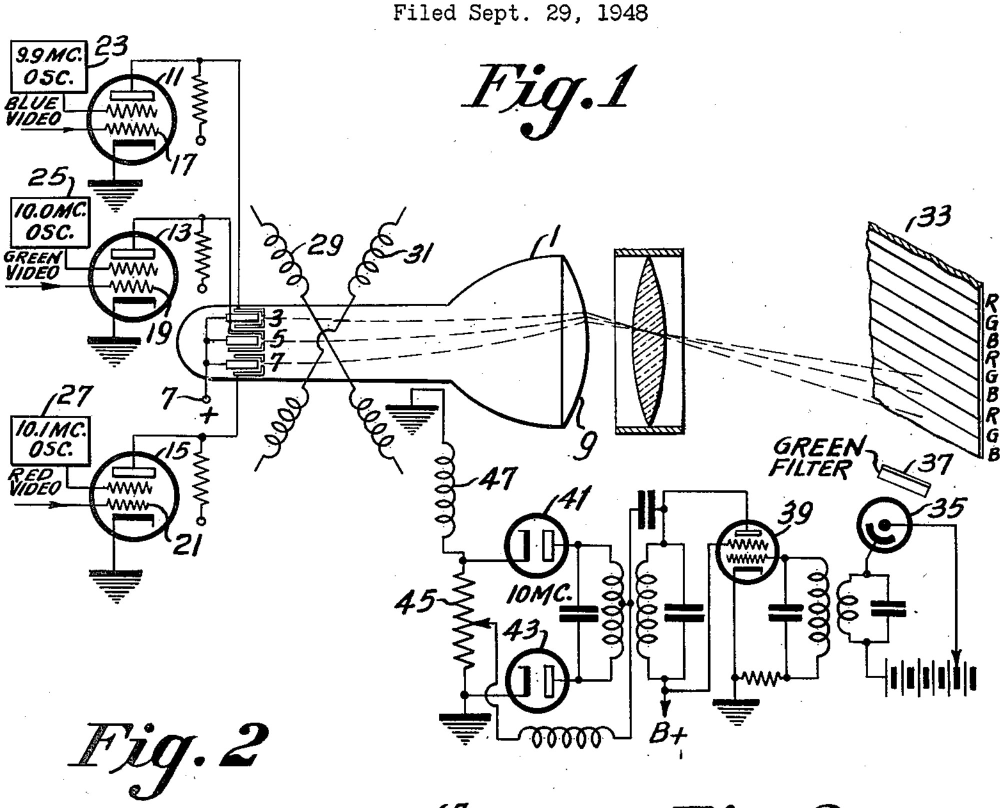

This invention relates to television and more particularly to methods and arrangements for the reproduction of images in substantially their natural color. The formation of images in substantially their natural color has heretofore been accomplished in television by the production of several independent component color images which are combined in registry to form an image in substantially its natural color. Such an arrangement is well shown and described in an article entitled, "An experimental simultaneous color television system," beginning on page 861, of the Proceedings of the Institute of Radio Engineers for September, 1947. In this article referred to, particular attention is directed to Part III, beginning on page 871, wherein the popular "trinoscope" is shown and described.

An examination of the description and theory of operation of the trinoscope will indicate that mechanical and optical precision is important to insure that the several images are projected in registry. In order to overcome the relatively stringent requirements for mechanical and optical accuracy, there have been proposed a number of arrangements wherein the image screen of the image reproducing tube is divided into elemental areas of the selected component colors in order to utilize a single electron target area for forming the several component color images in optical registry.

In the copending application of Alfred C. Schroeder entitled "Picture Reproducing Apparatus", Serial No. 730,637, filed February 24, 1947, a cathode ray tube for reproducing television images in color is proposed wherein a plurality of electron beams are developed closely together and all of the electron beams are deflected by a single deflection system common to all. Each of the electron beams is modulated by the signal response of one of the selected component colors of the televised image.

It will be understood, however, that in the practice of the several inventions referred to immediately above, it is necessary to provide a multiple element electron target screen. The multiple elements taking the form of the various selected component color light producing elements or taking the form of different color light producing phosphors.

In the arrangement wherein there is employed in the screen structure a plurality of horizontal strip-like selected component color light producing elements and along which the appropriately designated scanning beam is deflected, it will be understood that any deviation from accurate scanning in a vertical direction will cause serious error in color reproduction.

According to this invention, there is provided a color television image reproducing system employing a plurality of adjacently positioned strip-like and horizontally orientated different selected component color light producing elements for which there is provided a separately controlled electron scanning beam for each different selected component color. The intensity of each of the scanning beams is controlled in accordance with the appropriate color video signal and beam deflection means are arranged for directing the scanning of the beams substantially along their respective color designated light producing elements. Accurate vertical deflection control is obtained by separately modulating each of the video signals at a different carrier frequency and positioning a light sensitive device responsive to only one of the selected component colors to receive light from the elements. A frequency discriminator is excited by the light sensitive device and the center frequency of the frequency discriminator corresponds to the middle frequency of the modulating carrier frequencies. The output signal of the discriminator will provide a vertical deflection correction voltage which may be applied to the beam deflection means or an auxiliary deflection coil appropriately positioned.

Figures 2, 3:
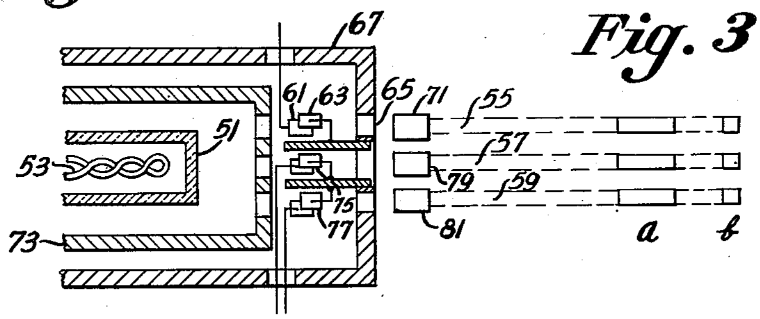
Figure 4:
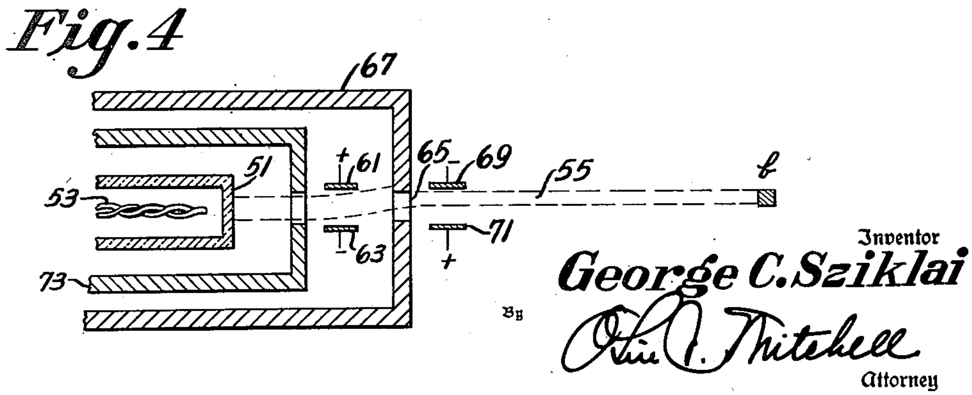

A primary object of this invention is to provide an improved color television image reproducing system. Another object of this invention is to provide improved vertical registry in color image reproduction. Other and incidental objects of this invention will be apparent to those skilled in the art from a reading of the following specification and an inspection of the accompanying drawing wherein:

Figure 1 illustrates schematically one form of this invention;

Figures 2, 3, and 4 show by enlarged cross sections, a multiple electron beam gun suitable for employment in the practice of this invention.

Turning now in more detail in Figure 1 there is illustrated a cathode ray tube 1 having three electron guns 3, 5, and 7. Each of the electron guns 3, 5, and 7 produces an independent electron beam which is directed at the screen 9 of the cathode ray tube 1. The intensity of each of the electron beams is separately controllable and, as illustrated, receives its control energy through signal channels involving tubes 11, 13, and 15 which, for the purpose of illustration, are directly coupled to the control electrodes of their respective electron guns.

A blue video signal is applied to the control electrode 17 of tube 11, a green video signal is applied to control electrode 19 of tube 13 and a red video signal is applied to control electrode 21 of tube 15. The blue, green, and red video signals may be obtained from a color television signal receiving arrangement of the type shown and described in the article entitled, "An experimental simultaneous color television system," referred to above, or a color television receiver involving arrangements proposed in my copending application entitled, "Signal Separator," Serial No. 760,400, filed July 11, 1947, wherein more effective amplification of independent signal trains representing selected component colors of composite image signal are amplified to a predetermined level before separation and then are amplified independently of one another.

The video signals in each of the color channels are modulated at different predetermined frequencies. In the form of the invention illustrated in Figure 1 this is accomplished by employing sine wave oscillators of 9.9 megacycles, 10.0 megacycles, and 10.1 megacycles, illustrated by blocks 23, 25, and 27 respectively. The oscillator 23 is connected to the auxiliary control electrode of tube 11, the oscillator 25 is connected to the auxiliary control electrode of tube 13, while oscillator 27 is connected to the auxiliary control electrode of tube 15.

It is necessary, of course, for the proper functioning of this invention that the frequencies of oscillators 23, 25, and 27 be sufficiently high that no visual indication thereof will be apparent to the observer.

By properly locating electron guns 3, 5, and 7 a single set of deflecting coils 29 and 31 may be employed for deflection in order to produce the desired scanning raster. Separate deflecting coils for each beam may, of course, be employed without departing from the spirit of this invention.

Appropriate deflection signals are applied to deflecting coils 29 and 31 to cause each electron beam of cathode ray tube 1 to scan the screen 9 in such a manner that it will intercept the projection screen 33 along the respective color strip of screen 33 which corresponds to the color designation of the appropriate scanning beam of electron guns 3, 5, and 7. That is, the electron beam generated by electron gun 3 connected to the blue video channel will be focused upon the blue strip of screen 33. The light from electron beam formed in electron gun 5 will be caused to scan across the green strip of screen 33. Likewise, the red representative electron beam formed in electron gun 7 will produce a light on tube screen 9 which is projected upon the red strip like element of screen 33.

Although this particular form of the invention illustrates a white light producing screen 9 to be used in connection with a colored screen 33, the colored screen 33 may, for example, take the form of a multiple element filter which is in contact with the tube screen 9. Tube screen 9 may also be composed of strip-like sections of appropriate colored light producing phosphors.

It will be seen that in order to have accurate reproduction of colors it is essential that the light from the scanning of any one of the scanning beams must follow accurately the appropriately designated color light forming element in the screen 33. It is perhaps possible to provide such an arrangement without auxiliary control but the accuracy with which the elements of the screen 33 would have to be positioned as well as the accuracy in the scanning operation makes such an arrangement quite impractical.

According to this invention, however, there is provided an auxiliary deflection control arrangement consisting of a photocell 35 which is made sensitive to only one of the selected component colors by passing the light from screen 33 through color filter 37 which corresponds to only one of the selected component colors in screen 33.

If, for example, filter 37 is green, only light from the green elements of screen 33 will actuate photocell 35.

In the arrangement shown and under correct deflection of the electron beams, the green repesentative beam which is modulated at 10 megacycles by oscillator 25 will cause a 10 megacycle current to flow through photocell 35. This 10 megacycle current is amplified in tube 39 and applied to the discriminator including diodes 41 and 43.

In accordance with well known discriminator operation, if the discriminator circuit is tuned to 10 megacycles, there will be no potential across resistor 45.

A potential is developed across resistor 45 when the applied frequency differs from 10 megacycles the voltage is applied to an auxiliary deflecting coil 47. The magnetic field of auxiliary coil 47 will deflect the electron beams. Although an auxiliary coil 47 is illustrated, the auxiliary deflection may be provided by the voltage applied to the vertical deflecting coils illustrated schematically as coils 31.

If, however, the deflection system is in error, either optically, physically, or electrically in such a manner as to cause the light from the blue designated scanning beam to rise into the green element of screen 33, photocell 35 will receive a frequency equal to 9.9 megacycles or that frequency of oscillator 23. In accordance with well known frequency discriminator operation, a change in frequency applied to the discriminator will cause a change in voltage across its output resistor 45. Appropriate polarization of the control voltage enables a compensating current to flow into auxiliary deflection coil 47 to correct for the error in the vertical direction.

Likewise, if the vertical registration is in error to cause light from the red designated scanning beam to scan along the green element of screen 33, photocell 35 will pick up a 10.1 megacycle signal of oscillator 27 and cause a change in the discriminator output voltage across resistor 45 and thus through auxiliary deflection coil 47 to correct the error.

Although there is suggested a particular form of electron gun structure in the drawing of Figure 1 and its accompanying description, another form of electron gun may be employed. This latter form of electron gun may take the form of that shown in Figures 2 and 4 of the drawing.

It is not intended here to explain the theory of operation of electron guns in detail because that is well done in the published art. For example, in an article entitled, "Theory of electron gun," in the Proceedings of the Institute of Radio Engineers for December, 1934, there is outlined in detail basic electron gun structure and theory of operation.

The particular form of electron gun illustrated in Figures 2 and 4 employs a single cathode element 51 together with its associated heater element 53 to produce three independently controlled electron scanning beams 55, 57, and 59.

The intensity of electron beam 55, is controlled independently of the intensity of electron beams 57 and 59 by a pair of deflection plates 61 and 63 to which is applied a video signal.

An edgewise view of the structure illustrated in Figure 2 is shown in Figure 4. In Figure 4 like numerals refer to the same elements.

If, for example, electron plate 61 is given a positive charge with respect to deflection plate 63, by an incoming video signal the beam is bent toward plate 61 as illustrated in Figure 4. Due to the edges of the orifice 65 some of the electrons of the electron beam 55 will be intercepted by member 67. The reduced size of electron beam 55 is illustrated graphically in Figure 3. If, for example, no potential difference is applied across deflecting plates 61 and 63, the intersection of the electron beam 55 and its associated target screen will appear as "*a*" in Figure 3. If, however, a potential is applied to deflecting plate 61 such as to make it positive with respect to its associated deflecting plate 63, a portion of the electrons of the electron beam will be intercepted by member 67 to produce a fluorescent spot taking the form of "*b*" of Figure 3. It will be seen that if sufficient potential difference is applied to deflecting plates 61 and 63, beam 55 may be extinguished entirely.

Referring again to Figure 4 it will be seen that the direction of the beam 55 is changed after it leaves the deflecting plates 61 and 63. If no compensation is made for this change in direction, distortion will result as such change in direction will influence the scanning pattern.

However, by positioning a pair of deflecting plates 69 and 71 immediately following the orifice 65 and having a potential applied thereto in phase opposition and equal magnitude to that potential applied to deflecting plates 61 and 63, and equal and opposite deflection may be obtained to that deflection obtained by deflection plates 61 and 63. In this manner the beam 55 will continue in a straightaway path to the scanning deflection field adjacent to the electron gun. Electrodes 67 and 73 may take the form of accelerating electrodes for purposes of developing the electron beams.

It will, of course, be understood that beams 57 and 59 may also contain deflecting electrodes 75 and 77 together with pairs of compensating deflecting electrodes 79 and 81. It will also be understood that a different selected component color representative signal train will be applied to the pairs of electrodes 75 and 77.

Although the blue, green, and red component colors have been selected for purposes of description of the operation of this invention, it is believed obvious that other suitable component colors may be selected without departing from the spirit of this invention.

It is believed also quite obvious that other frequencies may be chosen with entirely different values. In this respect, it is important, however, to select several carrier frequencies which are closely enough adjacent to each other that the discriminator will function properly.

According to still another form of this invention the modulation of the green video signal with a 10.0 megacycle signal is omitted and only the blue and red video signals are modulated. The theory of operation is not changed however, and vertical control is exercised in the auxiliary coil 47.

Other arrangements may be employed for converting the frequency received by photocell 35 into a direct current potential such as a circuit tuned to "off resonance" or other arrangements such as used in frequency modulation signal reception.

Although an arrangement involving a projection system is employed in Figure 1, a direct view screen may, of course, be employed in which case the cathode ray tube screen 9 will consist of alternate strips of component color-like producing phosphors or will be of the type involving a white light producing phosphor with multiple element filter attached thereto. If direct viewing is employed, the photocell 35 and its associated color filter 37 will "look" at the screen 9.

What is claimed is:

1. A color television system comprising, in combination, a plurality of adjacently positioned strip-like and horizontally orientated different selected component color light producing elements, a separately controlled electron scanning beam for each of the different selected component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, a signal mixer in each of said channels, an oscillator having a different frequency output from the other oscillators connected to each of said signal mixers, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency equal to the middle frequency of said oscillators, and means connected to the output circuit of said discriminator for controlling the vertical position of said electron beams.

2. A color television system comprising a plurality of similar groups of adjacently positioned strip-like and horizontally orientated different selected component color light producing elements, electron scanning beam for each of the different selected component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, a signal mixer in each of said channels, an oscillator having a different frequency output from the other oscillators connected to each of said signal mixers, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency equal to the middle frequency of said oscillators and arranged to cover all of said frequencies, and auxiliary deflection means connected to the output circuit of said discriminator for controlling the vertical position of said electron beams.

3. A color television system comprising, in combination, an image screen consisting of a plurality of adjacently positioned strip-like and horizontally orientated different selected component color light producing elements, an independent electron scanning beam for each of the different selected component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, a signal mixer in each of said channels, an oscillator having a different frequency output from the other oscillators connected to each of said signal mixers, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency equal to the middle frequency of said oscillators, and an auxiliary deflection coil connected to the output circuit of said discriminator for controlling the vertical position of said electron beams.

4. A color television system comprising, in combination, a projection screen, a plurality of adjacently positioned strip-like and horizontally orientated different selected component color light producing elements, electron scanning beam for each of the different selected component colors, a beam intensity control electrode for each of said electron scanning beams, separate component color video signal channels connected to each of said beam intensity control electrodes, beam deflection means for directing the scanning of said scanning beams substantially along their respective color designated light producing elements, a signal mixer in each of said channels, an oscillator having a different frequency output from the other oscillators connected to each of said signal mixers, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency equal to the middle frequency of said oscillators and a control connection between said beam deflection means and the output circuit of said discriminator for controlling the vertical position of said electron beams.

5. A color television system comprising, in combination, an electron beam target, a plurality of adjacently positioned strip-like and horizontally orientated different selected component color light producing elements, an independent electron scanning beam for each of the different selected component colors, a beam intensity control electrode for each of said electron scanning beams, beam deflection means for directing the scanning of said scanning beams substantially along one at a time of their respective color designated light producing elements, appropriately color designated video signal channels connected to each of said beam intensity control electrodes, means for modulating the video signal in each of said channels with a different frequency, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency equal to the midde frequency of said modulating means and means connected to the output circuit of said discriminator for controlling the vertical position of said electron beams.

6. A color television system comprising, in combination, a plurality of adjacently positioned strip-like and horizontally orientated different selected component color light producing elements, a separately controlled electron scanning beam for each of the different selected component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, means for modulating the video signal in each of said channels with a different frequency, said different frequencies being higher than any of said video frequencies, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency equal to the middle frequency of said modulating means and arranged to cover all of said frequencies and means connected to the output circuit of said discriminator for controlling the vertical position of said electron beams.

7. A color television system comprising, in combination, a plurality of similar groups of adjacently positioned strip-like and horizontally orientated, red, blue, and green light producing elements, a separately controlled electron scanning beam for each of the different selected component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, a signal mixer in each of said channels, an oscillator having a different frequency output from the other oscillators connected to each of said signal mixers, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency equal to the middle frequency of said oscillators and means connected to the output circuit of said discriminator for controlling the vertical position of said electron beams.

8. A color television system comprising, in combination, a plurality of similar groups of adjacently positioned strip-like and horizontally orientated red, blue, and green component color light producing elements, a separately controlled electron scanning beam for each of the different component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, a signal mixer in each of said channels, an oscillator having a different frequency output from the other oscillators connected to each of said signal mixers, a light sensitive device responsive to only one of said component colors, said light sensitive device positioned to receive light from said elements, a frequency discriminator having input and output circuits, a connection between said light sensitive device and said frequency discriminator input circuit, said frequency discriminator having a center frequency equal to the middle frequency of said oscillators, and means connected to the output circuit of said discriminator for controlling the vertical position of said electron beams.

9. A color television system comprising, in combination, a plurality of adjacently positioned strip-like and horizontally orientated different selected component color light producing elements, a separately controlled electron scanning beam for each of the different selected component colors, a beam intensity control electrode for each of said electron scanning beams, beam deflection means for directing the scanning of said scanning beams substantially along their respective color designed light producing elements, appropriately color designated video signal channels connected to each of said beam intensity control electrodes, a signal mixer in each of two of said channels, an oscillator having a different frequency output from the other oscillator connected to each of said signal mixers, a light sensitive device responsive to only one of said selected component colors, said light sensitive device positioned to receive light from said elements, a frequency discriminator having input and output circuits, a connection between said light sensitive device and said frequency discriminator input circuit, said frequency discriminator having a center frequency between the frequency of said oscillators, and means connected to the output of said discriminator for controlling the vertical position of said electron beams.

10. A color television system comprising, in combination, a plurality of similar groups of adjacently positioned strip-like and horizontally orientated red, blue, and green component color light producing elements, a separately controlled electron scanning beam for each of the different component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, a signal mixer in each of two of said channels, an oscillator having a different frequency output from the other oscillator connected to each of said signal mixers, a light sensitive device responsive to only one of said component colors, said light sensitive device positioned to receive light from said elements, a frequency discriminator having input and output circuits, a connection between said light sensitive device and said frequency discriminator input circuit, said frequency discriminator having a center frequency between the frequency of said oscillators, and means connected to the output circuit of said discriminator for controlling the vertical position of said electron beams.

11. A color television system comprising, in combination, a plurality of adjacently positioned strip-like and horizontally orientated different selected component color light producing elements, a separately controlled electron scanning beam for each of the different selected component colors, a beam intensity control electrode for each of said electron scanning beams, beam deflection means for directing the scanning of said scanning beams substantially along their respective color designated light producing elements, appropriately color designated video signal channels connected to each of said beam intensity control electrodes, a signal mixer in each of said channels, an oscillator having a different frequency output from the other oscillators connected to each of said signal mixers, a light sensitive device responsive to only one of said selected component colors, said light sensitive device positioned to receive light from said elements, and frequency responsive means connected to said light sensitive device for controlling the vertical position of said electron beam.

GEORGE C. SZIKLAI.

REFERENCES CITED

The following references are of record in the file of this patent:

UNITED STATES PATENTS

| Number | Name | Date |
|---|---|---|
| 2,227,002 | Schlesinger | Dec. 31, 1940 |
| 2,294,820 | Wilson | Sept. 1, 1942 |
| 2,307,212 | Goldsmith | Jan. 5, 1943 |
| 2,415,059 | Zworykin | Jan. 28, 1947 |
| 2,480,848 | Geer | Sept. 6, 1949 |
| 2,490,812 | Huffman | Dec. 13, 1949 |